United States Patent Office 2,802,093
Patented Aug. 6, 1957

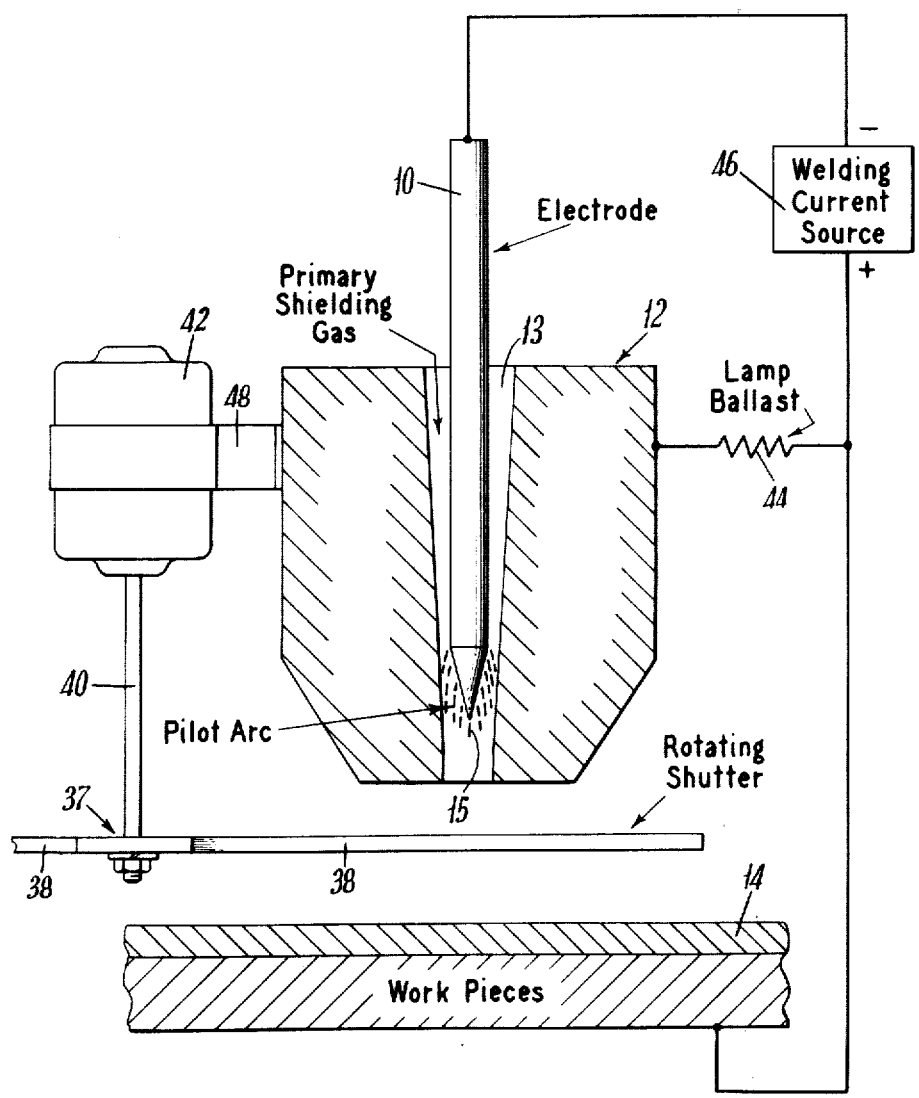

2,802,093

ARC TORCH INTERRUPTION

Robert M. Gage, Buffalo, N. Y., assignor to Union Carbide Corporation, a corporation of New York Application April 10, 1956, Serial No. 577,312

8 Claims. (Cl. 219—130)

This invention relates to arc torch interruption and more particularly to method and apparatus for interrupting the arc of the torch.

While interruption of the arc of the arc torch is of general application, it is of particular advantage for spot welding. Heretofore arc spot welding with non-consumable electrodes has been done either by touching the electrode to the work and retracting to start, or by the use of high frequency high voltage starting. The touch start method has the disadvantage of electrode erosion with consequent poor arc control and extensive maintenance. The high frequency method creates radio interference. Both methods use heavy circuit breakers which add to the expense.

The main objects of the present invention are to avoid the difficulties referred to above, and to provide method and apparatus for interrupting the arc of the arc torch for spot welding and other uses.

According to the present invention, the arc torch apparatus using a transferred arc is adapted to interrupt the arc by the use of a removable shutter placed between the torch and the work. The arc is initiated when the shutter is removed and extinguished when the shutter is replaced. The arc torch comprises a non-consumable electrode with an arc directing and stabilizing annulus, which also functions as a pilot arc electrode. The arc is operated with direct current straight polarity current. The arc from the electrode to the work is established or extinguished by the shutter. A lengthened stable arc conveniently allows the use of the shutter feature and eliminates touch starting or high frequency starting and also acts as its own circuit breaker. The instantaneous ignition is assured by the pilot arc circuit.

Direct current reverse polarity current can be used in which case the electrode may be cooled, for example, a water-cooled copper electrode with either a copper or tungsten tip. Alternating current can also be used for the main arc power. In this instance however the pilot arc from the nozzle to the stick electrode should be separately powered with direct current.

The shutter material can be metal or non-metal. It was found that a sheet of cardboard quickly inserted between the torch and the work effectively extinguished the main arc without being carried.

The gaseous atmosphere of the arc column which passes through the arc annulus of the torch can be any gas or gas mixtures which are metallurgically acceptable to the materials being welded, and to the tungsten electrode. A secondary shielding gas may be used for the additional protection of the work, but is not essential to the spot welding operation.

In the drawing, the single figure is a vertical longitudinal cross section through a spot welding arc torch according to, and for carrying out the method of, the present invention.

The torch shown comprises a suitable primary electrode 10 axially aligned with a nozzle 12 provided with an internal annular passage 13 through which passes inert gas such as argon, helium, hydrogen, nitrogen or mixtures thereof. The other primary electrode is a metal workpiece 14.

A pilot arc 15 extends between the electrode 10 and the wall of the passage 13. An extremely hot electrically conductive effluent issues from the outlet of the nozzle 12 of the torch. The nozzle passage 13 laterally shapes and directs the arc column.

The shutter 37 comprises one or more blades 38 secured onto a shaft 40 driven by a motor 42, connected by a mounting bracket 48 to the nozzle 12.

In operation, the arc torch comprising for example a one-eighth inch diameter thoriated tungsten electrode 10 axially mounted in nozzle 12 having a three-sixteenths inch diameter by one-quarter inch long orifice extending beyond the electrode tip is employed to spot weld a one-sixteenth inch thick sheet of stainless steel 14. The distance from the exit end of the torch to the work is about a half inch. The main power arc from the electrode 10 to the work is 36 volts 110 amperes direct current straight polarity. Power to the pilot arc 15 from the electrode 10 to the nozzle 12 is also direct current straight polarity supplied through a ballast lamp 44 connected to the main power supply 46. The gas flow through the torch orifice is five cubic feet per hour of welding grade argon. The main arc is easily extinguished by quickly interposing a one-sixteenth inch thick sheet of aluminum into the space between the nozzle and the work. Immediately upon removal of the sheet metal shutter the main arc is established and a good spot weld about three-sixteenths inch welded diameter is made between the one-sixteenth inch and one-eight inch thick stainless steel sheets with an arc timing of about ten seconds.

Arc interruption of a transferred arc torch is conveniently carried out by interposing the multi-bladed shutter 37 between the torch outlet and a workpiece anode 14. Rapid and effective interruption is provided by the variable speed electric motor 42 driving the shutter 37 through the shaft 40. The frequency of interruption can be varied from zero to twenty times per second by this means under arc conditions of 200 amperes.

What is claimed is:

1. Method of gas shielded arc torch arc interruption, which comprises striking a pilot arc between the torch electrode and an inner wall of the torch nozzle, positioning a shutter between the orifice of the torch and a target electrode, and removing the shutter to convert the pilot arc to a main arc.

2. Method of gas shielded arc torch arc interruption, which comprises striking a pilot arc between the torch electrode and an inner wall of the torch nozzle, bringing the pilot arc near a target electrode to transfer the arc from said inner wall to said target electrode, and alternately interrupting and restoring said main arc by repeatedly moving a shutter between the orifice of the torch and said target electrode.

3. Apparatus for gas shielded arc torch arc interruption, which comprises means for striking a pilot arc between the torch electrode and an inner wall of the torch nozzle, means for positioning a shutter between the orifice of the torch and a target electrode, and means for removing the shutter to strike the main arc between said torch electrode and said target electrode.

4. Apparatus for gas shielded arc torch arc interruption, which comprises means for striking a pilot arc between the torch electrode and an inner wall of the torch nozzle, said pilot arc being transferred from said inner wall to a target electrode to establish the main arc, and a shutter for alternately interrupting and restoring said main arc.

5. Method of gas shielded arc torch spot welding, which comprises striking a pilot arc between a non-consumable electrode and an inner wall of the torch nozzle, positioning a shutter below the orifice of the torch, positioning the shutter above the workpiece, and removing the shutter to strike the main arc between said electrode and said workpiece.

6. Method of gas shielded arc torch spot welding, which comprises striking a pilot arc between a non-consumable electrode and an inner wall of the torch nozzle, bringing the pilot arc near a workpiece to transfer the arc from said inner wall to the workpiece; and alternately interrupting and restoring said main arc by repeatedly moving a shutter between the orifice of the torch and said workpiece.

7. Apparatus for gas shielded arc torch spot welding, which comprises means for striking a pilot arc between a non-consumable electrode and an inner wall of the torch nozzle, means for positioning a shutter between the orifice of the torch and a workpiece, and means for removing the shutter to strike the main arc between said electrode and said workpiece.

8. Apparatus for gas shielded arc torch spot welding, which comprises means for striking a pilot arc between a non-consumable electrode and an inner wall of the torch nozzle, said pilot arc being transferred from said inner wall to said workpiece to establish the main arc, and a shutter for alternately interrupting and restoring said main arc.

References Cited in the file of this patent

UNITED STATES PATENTS 933,027    Erickson et al. _____ Aug. 31, 1909

UNITED STATES PATENT OFFICE
CERTIFICATE OF CORRECTION

Patent No. 2,802,093

August 6, 1957

Robert M. Gage

It is hereby certified that error appears in the printed specification of the above numbered patent requiring correction and that the said Letters Patent should read as corrected below.

Column 1, line 58, for "carried" read -- charred --.

Signed and sealed this 29th day of October 1957.

(SEAL)
Attest:
KARL H. AXLINE
Attesting Officer

ROBERT C. WATSON
Commissioner of Patents